US011785564B2

(12) United States Patent
Kwon et al.

(10) Patent No.: US 11,785,564 B2
(45) Date of Patent: Oct. 10, 2023

(54) COMMUNICATION NODE AND COMMUNICATION SYSTEM FOR PERFORMING CLOCK SYNCHRONIZATION

(71) Applicant: SOLiD, INC., Seongnam-si (KR)

(72) Inventors: Donghee Kwon, Yongin-si (KR); Hoopyo Hong, Seongnam-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 17/530,552

(22) Filed: Nov. 19, 2021

(65) Prior Publication Data
US 2022/0078732 A1 Mar. 10, 2022

Related U.S. Application Data

(63) Continuation of application No. 16/638,239, filed as application No. PCT/KR2019/006255 on May 24, 2019, now Pat. No. 11,206,625.

(30) Foreign Application Priority Data

May 25, 2018 (KR) .................... 10-2018-0059644

(51) Int. Cl.
*H04W 56/00* (2009.01)
*H04J 3/06* (2006.01)
(52) U.S. Cl.
CPC ......... *H04W 56/001* (2013.01); *H04J 3/0623* (2013.01)
(58) Field of Classification Search
CPC ...... H04J 3/0623; H04J 3/0638; H04J 3/0688; H04J 3/0644; H04J 3/0685; H04W 88/085
See application file for complete search history.

(56) References Cited

U.S. PATENT DOCUMENTS

| 10,383,069 | B2 * | 8/2019 | Nguyen-Dang .. H04W 52/0222 |
| 2003/0016770 | A1 * | 1/2003 | Trans ........................ H04B 3/32 |
| | | | 375/346 |
| 2010/0135276 | A1 * | 6/2010 | Hedin ................... H04J 3/0641 |
| | | | 370/350 |

(Continued)

FOREIGN PATENT DOCUMENTS

| CN | 205029787 U | 2/2016 |
| EP | 1 713 290 B1 | 3/2010 |

(Continued)

OTHER PUBLICATIONS

Extended European Search Report dated Feb. 16, 2021 from the European Patent Office in Application No. 19808312.3.

(Continued)

*Primary Examiner* — Chi H Pham
*Assistant Examiner* — Vladislav Y Agureyev
(74) *Attorney, Agent, or Firm* — Sughrue Mion, PLLC

(57) ABSTRACT

A communication system comprises a clock generator configured to generate a plurality of system clock signals used to synchronize components included in each of communication nodes in the communication system based on an external clock signal provided by an external clock source located outside the communication system and a physical layer configured to transmit any one of the generated system clock signals to a small cell communicatively connected to an end communication node of the communication system.

12 Claims, 4 Drawing Sheets

(56) References Cited

U.S. PATENT DOCUMENTS

| | | |
|---|---|---|
| 2011/0170645 A1 | 7/2011 | Barnette et al. |
| 2012/0027145 A1 | 2/2012 | Uyehara et al. |
| 2012/0063296 A1 | 3/2012 | Wang et al. |
| 2012/0314797 A1* | 12/2012 | Kummetz ............... H04L 27/34 |
| | | 375/295 |
| 2013/0091531 A1* | 4/2013 | Danielsson ........... H04J 3/0644 |
| | | 725/116 |
| 2013/0107808 A1 | 5/2013 | He et al. |
| 2014/0036903 A1 | 2/2014 | Ryan |
| 2015/0098372 A1 | 4/2015 | Zavadsky et al. |
| 2015/0156284 A1 | 6/2015 | Akhter et al. |
| 2015/0304971 A1 | 10/2015 | Shor et al. |
| 2016/0072619 A1 | 3/2016 | Zhu |
| 2017/0055236 A1* | 2/2017 | Levesque ............... H04J 3/0644 |
| 2017/0155501 A1* | 6/2017 | Kyouno ................. H04Q 11/04 |
| 2017/0288801 A1* | 10/2017 | Aweya .................. H04J 3/0661 |
| 2018/0007736 A1* | 1/2018 | Ruttik ................... H04W 88/08 |
| 2018/0124729 A1 | 5/2018 | Hanson |
| 2018/0310269 A1* | 10/2018 | Mayer ............... H04W 56/0045 |
| 2018/0376337 A1 | 12/2018 | Hasarchi et al. |
| 2019/0089359 A1* | 3/2019 | Mehta .................... H03M 9/00 |
| 2019/0191318 A1 | 6/2019 | Jovanovic |
| 2019/0334643 A1* | 10/2019 | Neugeboren ....... H04L 12/4625 |
| 2019/0386761 A1* | 12/2019 | Lewis ................... H04J 3/0638 |
| 2020/0142023 A1* | 5/2020 | Markhovsky ......... G01S 5/0218 |
| 2021/0105645 A1* | 4/2021 | Rune .................... H04B 7/0695 |
| 2021/0112521 A1* | 4/2021 | Dwivedi ............... H04W 64/00 |

FOREIGN PATENT DOCUMENTS

| | | | |
|---|---|---|---|
| EP | 2789107 A1 | 10/2014 | |
| EP | 3516773 B1 * | 3/2020 | ............. H03K 19/21 |
| KR | 10-2014-0132362 A | 11/2014 | |

OTHER PUBLICATIONS

International Search Report of PCT/KR2019/006255 dated Aug. 29, 2019 [PCT/ISA/210].

Notice of Allowance issued in parent U.S. Appl. No. 16/638,239 dated Aug. 13, 2021.

Office Action issued in parent U.S. Appl. No. 16/638,239 dated Feb. 11, 2021.

Communication dated Apr. 26, 2023 from the European Patent Office in Application No. 19808312.3.

* cited by examiner

COMMUNICATION NODE AND COMMUNICATION SYSTEM FOR PERFORMING CLOCK SYNCHRONIZATION

CROSS REFERENCE TO RELATED APPLICATIONS

This application is a continuation of U.S. application Ser. No. 16/638,239 filed on Feb. 11, 2020, which is a National Stage of International Application No. PCT/KR2019/006255, filed on May 24, 2019, which claims priority from Korean Patent Application No. 10-2018-0059644, filed on May 25, 2018, in the Korean Patent Office.

TECHNICAL FIELD

The present disclosure relates to a communication node and a communication system for performing clock synchronization, and more particularly, to a communication node and a communication system capable of generating a plurality of system clock signals using an external clock provided by an external clock source and controlling synchronization of communication signals transmitted and received between an end communication node and a small cell based on any one of the generated system clock signals.

BACKGROUND ART

A distributed antenna system (DAS) is a system that may solve the problem of communication shadow areas or high traffic concentration in a specific area by spatially distributing a plurality of antennas.

The distributed antenna system is installed in buildings, tunnels, subways, etc. to provide communication services even to a shadow area where base transceiver station signals are difficult to reach. The distributed antenna system is also used to provide smooth services in stadiums, large-sized facilities, and places where service demand is high.

Recently, in the distributed antenna system, there is an increasing demand for transmission of Ethernet data or Internet Protocol (IP) data as well as transmission of RF signals.

DESCRIPTION OF EMBODIMENTS

Technical Problem

Provided are a communication node and a communication system for performing clock synchronization capable of generating a plurality of system clock signals using an external clock provided by an external clock source and controlling synchronization of communication signals transmitted and received between an end communication node and a small cell based on any one of the generated system clock signals.

Solution to Problem

According to an aspect of an embodiments, a communication system comprising: a clock generator configured to generate a plurality of system clock signals used to synchronize components included in each of communication nodes in the communication system based on an external clock signal provided by an external clock source located outside the communication system; and a physical layer configured to transmit any one of the generated system clock signals to a small cell communicatively connected to an end communication node of the communication system.

According to an aspect of an embodiments, the communication system may relay at least one of an analog RF signal and a baseband digital signal together with at least one of Ethernet data and IP data.

According to an aspect of an embodiments, the baseband digital signal may be a digital signal according to a standard of any one of Common Public Radio Interface (CPRI), Open Baseband Remote Radiohead Interface (OBSAI), Open Radio Interface (ORI), and eCPRI.

According to an aspect of an embodiments, the physical layer may comprise an Ethernet physical layer, and the any one of the system clock signals is transmitted to the small cell according to a synchronous Ethernet (SyncE) standard.

According to an aspect of an embodiments, the external clock source may be any one of a primary reference source (PRS), a primary reference clock (PRC), a synchronization supply unit (SSU), stand-alone synchronization equipment (SASE), a building integrated timing supply (BITS), an SDH equipment clock (SEC), a base station, and a GPS device that are located outside the communication system and communicatively connected to each other.

According to an aspect of an embodiments, the plurality of system clock signals may comprise at least one of a first system clock signal commonly used for synchronization of an RF processing part included in the communication nodes in the communication system, a second system clock signal commonly used for synchronization of an Ethernet processing part included in the communication nodes, a third system clock signal commonly used for synchronization of a main processing part included in the communication nodes, and a fourth system clock signal commonly used for synchronization of a physical layer transceiver included in the communication nodes.

According to an aspect of an embodiments, the plurality of system clock signals may be clock signals having different frequencies.

According to an aspect of an embodiments, the communication nodes in the communication system may be connected to each other through an optical link.

According to an aspect of an embodiments, the any one of the system clock signals may be a system clock signal having a frequency equal to that of the second system clock signal.

According to an aspect of an embodiments, the end communication node of the communication system may be a remote device.

According to an aspect of an embodiments, the external clock may be received through a head-end device in the communication system.

According to an aspect of an embodiments, the clock generator may be included in the end communication node of the communication system, and generate the plurality of system clock signals using a clock recovered from a communication signal which is transmitted from the head-end device and received at the end communication node after being synchronized based on the external clock.

According to an aspect of an embodiments, the external clock may be received directly at the end communication node in the communication system.

According to an aspect of an embodiments, the clock generator may be included in the end communication node of the communication system and generate the plurality of system clock signals based on the directly received external clock.

According to an aspect of an embodiments, a communication node comprising: a clock generator configured to generate a plurality of system clock signals used to synchronize components included in the communication node based on an external clock provided by an external clock source located outside the communication node or a communication signal received in synchronization with the external clock; and a physical layer configured to transmit any one of the generated system clock signals to a small cell communicatively connected to the communication node.

Advantageous Effects of Disclosure

Methods and devices according to an embodiment of the present disclosure may generate a plurality of system clock signals using an external clock provided by an external clock source and may effectively control synchronization of communication signals transmitted and received between an end communication node and a small cell based on any one of the generated system clock signals.

BRIEF DESCRIPTION OF DRAWINGS

The above and other aspects, features, and advantages of certain embodiments of the present disclosure will be more apparent from the following description taken in conjunction with the accompanying drawings, in which.

BEST MODE

Figure 1:
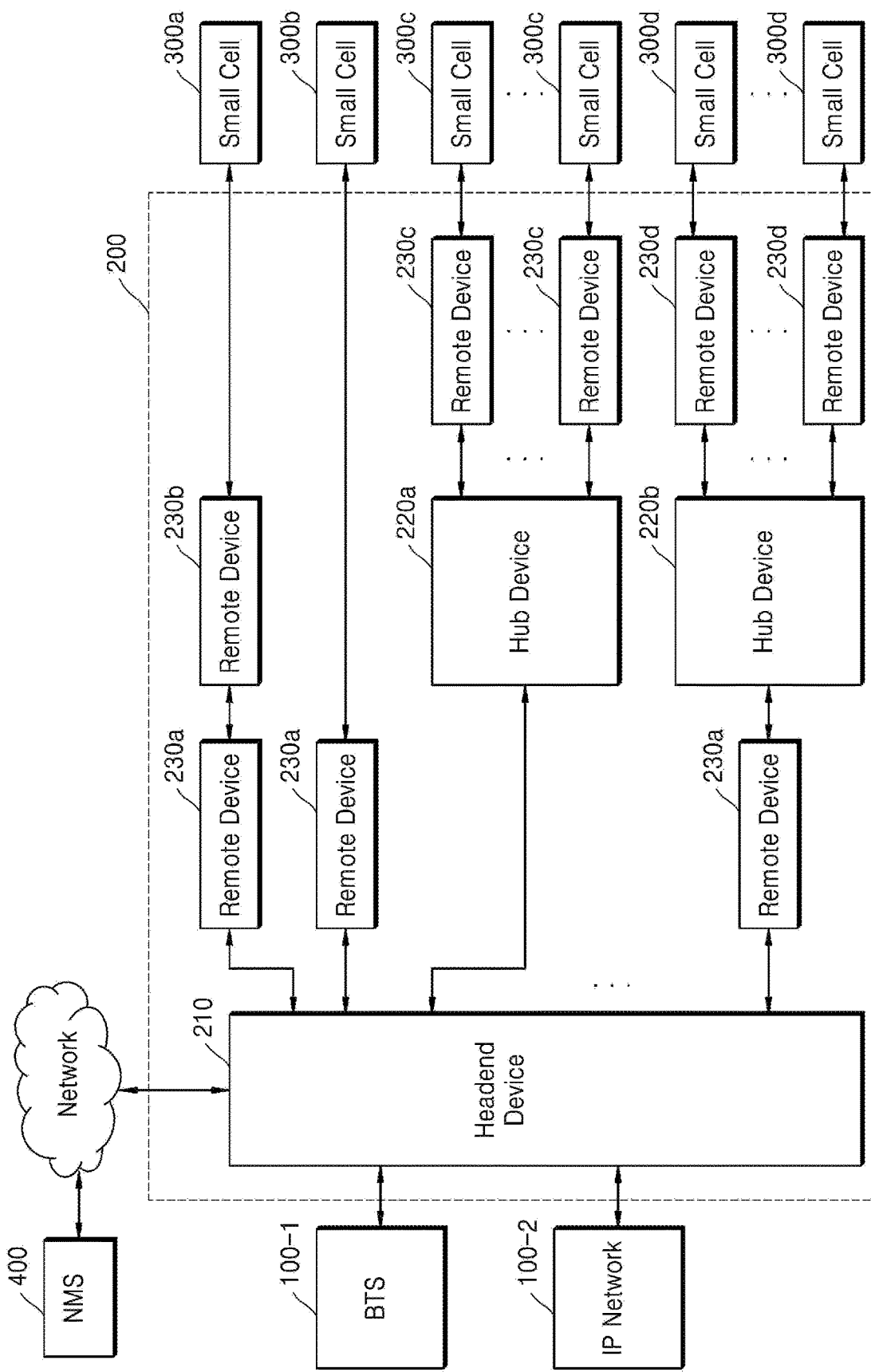
FIG. 1 is a block diagram of a communication system according to an embodiment.

The inventive concept may be variously modified and have various embodiments, so that specific embodiments will be illustrated in the drawings and described in the detailed description. However, this does not limit the inventive concept to specific embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the present disclosure. In addition, numeral figures (e.g., 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

A distributed antenna system according to an example embodiment of the inventive concept is a coverage system for an in-building service that transmits voice communication and data communication with high quality and seamlessness. It is also a system for servicing analog and digital telephone systems serviced in multiple bands with at least one antenna.

The distributed antenna system according to an embodiment of the inventive concept improves a poor propagation environment in a building, improves a poor received signal strength indication (RSSI) and the overall reception sensitivity of a mobile terminal, chip energy/other interferences (Ec/Io), and provides a mobile communication service to every corner of the building so that a user of the mobile communication service can freely talk anywhere in the building.

The distributed antenna system according to an embodiment of the inventive concept may support the mobile communication standard used worldwide. For example, the distributed antenna system may support a time division duplex (TDD) service as well as a frequency division duplex (FDD) service, a very-high frequency (VHF), an ultra-high frequency (UHF), and frequencies of 700 MHz, 800 MHz, 850 MHz, 900 MHz, 1900 MHz, 2100 MHz, and 2600 MHz bands. Furthermore, the distributed antenna system may support a number of mobile communication standards such as a typical analog mobile communication service, that is, an advanced mobile phone service (AMPS), digital time-division multiple access (TDMA), code-division multiple access (CDMA), wideband code-division multiple access (WCDMA), high-speed downlink packet access (HSDPA), long-term evolution (LTE), LTE-advanced (LTE-A), 5G, and so on.

Hereinafter, embodiments of the inventive concept will be described in detail in turn.

FIG. 1 is a block diagram of a communication system according to an embodiment.

In FIG. 1, for convenience of description, a base transceiver station 100-1, an IP network 100-2, a plurality of small cells 300a to 300d for transmitting and receiving a communication signal through a communication system 200 according to an embodiment of the present disclosure, and a network management server or a network management system (NMS) 400 for managing the communication system 200 are shown together.

The communication system 200 according to an embodiment may be referred to as a distributed antenna system (DAS).

Referring to FIG. 1, the communication system 200 may include a head-end device 210 that constitutes a head-end node and are communicatively connected to the base transceiver station (BTS) 100-1 and the IP network 100-2, extension devices 220a and 220b constituting an extension node, and a plurality of remote devices 230a, 230b, 230c, and 230d which constitute a remote node and are connected to another remote node or disposed at each service location of the remote to communicate with a user terminal.

According to an embodiment, the communication system 200 may relay at least one of an analog RF signal and a baseband digital signal together with at least one of Ethernet data and IP data.

According to an embodiment, the base station 100-1 may be a signal source of the analog RF signal or the baseband digital signal relayed by the communication system 200.

For example, the baseband digital signal may be a digital signal according to a standard of any one of Common Public Radio Interface (CPRI), Open Baseband Remote Radiohead Interface (OBSAI), Open Radio Interface (ORI), and eCPRI.

According to an embodiment, the communication system 200 may include some components of the base station 100-1 or the IP network 100-2 or may perform some functions of the base station 100-1 or the IP network 100-2.

According to an embodiment, the base station 100-1 may be configured in plural.

Meanwhile, FIG. 1 shows an example of a topology of the communication system 200 and various variations are possible in the communication system 200 considering specificity of installation areas and application fields (e.g., in-building, a subway, a hospital, a stadium, etc.). For example, the number of the head-end device 210, the extension devices 220a and 220b, and the remote devices 230a, 230b, 230c, and 230d, and a connection relationship between upper and lower ends thereof may be different from FIG. 1.

In the present specification, the term "end communication node of a communication system" may mean a node that processes and transmits a communication signal last in a communication system.

According to an embodiment, the extension devices 220a and 220b in the communication system 200 may be utilized when the number of branches of the head-end device 210 is limited compared to the number of remote devices that need to be installed.

Each node in the communication system 200 and its functions will be described in more detail. First, the head-end device 210 may interface with the base station 100-1 and the IP network 100-2.

According to an embodiment, the head-end device 210 may be connected to a plurality of base stations.

According to an embodiment, the head-end device 210 may be implemented as a main head-end device and a sub head-end device, and may be connected to a base station for each service frequency band of a specific service provider or a base station for each sector. In some cases, the main head-end device may compensate for coverage by the sub head-end device.

The head-end device 210 may selectively transmit at least one of an analog RF signal and a baseband digital signal received from the base station 100-1, and at least one of Ethernet data and IP data received from the IP network 100-2 to the extension device 220a or the remote device 230a.

According to an embodiment, the head-end device 210 may combine at least one of the analog RF signal and the baseband digital signal received from the base station 100-1 and at least one of the Ethernet data and the IP data received from the IP network 100-2 to transmit the combined signal to the extension device 220a or the remote device 230a.

According to another embodiment, the head-end device 210 may directly receive and process a baseband signal from the base station 100-1.

Detailed structure and operation of the head end device 210 will be described later with reference to FIG. 2.

The extension device 220a may transmit the received signal to the remote device 230c connected to the extension device 220a.

The extension device 220b is connected to one end of the remote device 230a and may receive a signal received from the head-end device 210 through the remote device 230a in downlink communication. The extension device 220b may transmit the received signal back to the remote device 230d connected to a rear end of the extension device 220b.

Each of the remote devices 230a, 230b, 230c, and 230d may perform signal processing such as separating, amplifying, and transmitting of the analog RF signal or the baseband digital signal included in the received signal for each frequency band. Accordingly, each of the remote devices 230a, 230b, 230c, and 230d may transmit a base station signal to a user terminal in its service coverage through a service antenna (not shown).

The remote devices 230a, 230b, 230c, and 230d may transmit Ethernet data or IP data included in the received signal to the small cells 300a, 300b, 300c, and 300d that are communicatively connected to the remote devices 230a, 230b, 230c, and 230d, respectively.

Each of the remote devices 230a, 230b, 230c, and 230d, together with the Ethernet data or the IP data, may transmit any one of system clock signals used in the communication system 200 to the small cells 300a, 300b, 300c, and 300d, respectively.

According to an embodiment, the remote device 230a and the remote device 230b, and the remote device 230c and the remote device 230c may be connected to each other through an optical link or an RF cable, and a plurality of remote devices may be connected to each other in a cascade structure if necessary.

At a lower end of the head-end device 210, the head-end device 210, the extension devices 220a and 220b, and the remote devices 230a, 230b, 230c, and 230d may be connected to each other through the optical link, but a signal transport medium or a communication method between each node may vary.

For example, at least one of the head-end device 210 and the extension device 220a, the head-end device 210 and the remote device 230a, and the extension devices 220a and 220b and the remote device 230c and 230d may be connected to each other through an RF cable, a twisted cable, a UTP cable or the like in addition to the optical cable.

Therefore, in the communication system 200, the head-end device 210, the extension devices 220a and 220b, and the remote devices 230a, 230b, 230c, and 230d may include an optical transceiver module for transmitting and receiving optical signals through electro-optical conversion/photoelectric conversion, and may further include a wavelength division multiplexing (WDM) device when nodes are connected to each other by a single optical cable.

The small cells 300a, 300b, 300c, and 300d may be communicatively connected to a rear end of each of the remote devices 230a, 230b, 230c, and 230d, respectively.

According to an embodiment, the remote devices 230a, 230b, 230c, and 230d and the small cells 300a, 300b, 300c, and 300d may communicate with each other, respectively, according to a synchronous Ethernet (SyncE) standard.

In the present specification, the term "small cell" may broadly mean a small base station, and may collectively refer to a cell covering a narrow range such as small output base station equipment, a picocell, a femtocell, and a metrocell, and the small cell may support heterogeneous communication such as Wi-Fi.

The communication system 200 may be connected to an external management device (not shown) such as a network management server or a network management system (NMS) 300, a network operation center (NOC) (not shown), and the like via a network. Accordingly, an administrator may remotely monitor the status and problem of each node of the communication system 200, and may remotely control the operation of each node.

Figure 2:
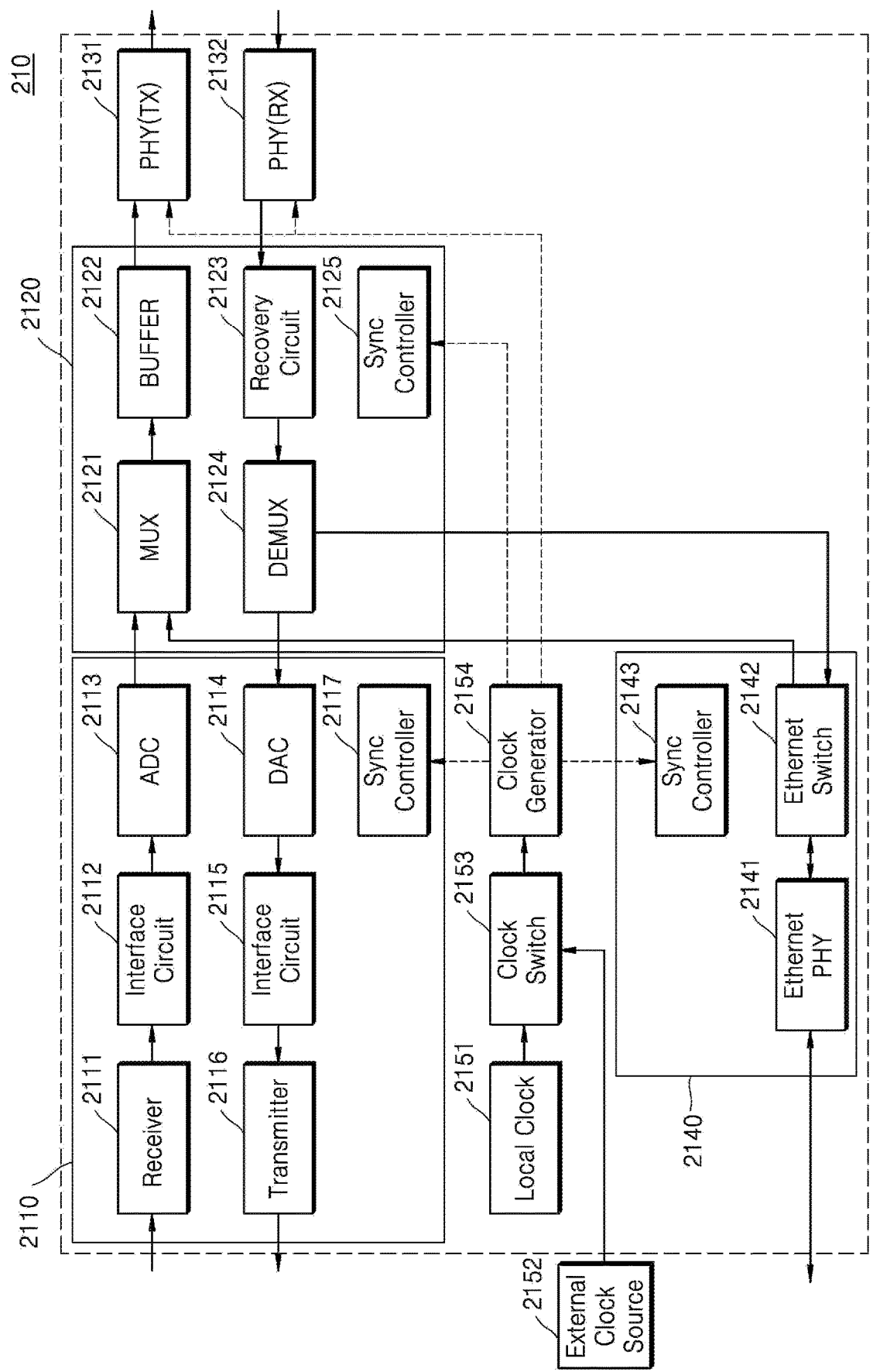
FIG. 2 is a block diagram according to an embodiment of a head-end device in FIG. 1.

FIG. 2 is a block diagram according to an embodiment of the head-end device 210 in FIG. 1.

Referring to FIGS. 1 and 2, the head-end device 210 may include an RF processing part 2110, a main processing part 2120, a physical layer transmitter 2131, a physical layer receiver 2132, an Ethernet processing part 2140, a local clock 2151, a clock switch 2153, and a clock generator 2154.

The RF processing part 2110 is a part for processing an RF signal transmitted and received with the base station 100-1 or a signal (analog signal or digital signal) generated based on the RF signal.

According to an embodiment, the RF processing part 2110 may transmit and receive an analog RF signal or a baseband digital signal with the base station 100-1.

The RF processing part 2110 may include a receiver 2111, a first interface circuit 2112, an analog-to-digital converter 2113, a digital-to-analog converter 2114, a second interface circuit 2115, a transmitter 2116, and a synchronization controller 2117.

In downlink communication, the receiver 2111 may receive a downlink signal received from the base station 100-1 and transmit the downlink signal to the first interface circuit 2112.

The first interface circuit 2112 may interface the downlink signal received from the receiver 2111. According to an embodiment, the first interface circuit 2112 may interface the received downlink signal to be processed in the communication system 210 by adjusting the power of the received downlink signal or down-converting frequencies.

The analog-to-digital converter 2113 may output a digital signal by analog-to-digital converting the downlink signal interfaced through the first interface circuit 2112.

According to an embodiment, when the receiver 2111 receives a digital signal from the base station 100-1, the analog-to-digital converter 2113 may not be included in the RF processing part 2110.

In uplink communication, the digital-to-analog converter 2114 may digital-to-analog convert an uplink signal to output an analog signal.

According to an embodiment, when the transmitter 2116 transmits a digital signal to the base station 100-1, the digital-to-analog converter 2114 may not be included in the RF processing part 2110.

The second interface circuit 2115 may interface an uplink signal output by the digital-to-analog converter 2114. According to an embodiment, the second interface circuit 2115 may process the uplink signal to be transmitted to the base station 100-1 by adjusting the power of the uplink signal or up-converting frequencies.

The transmitter 2116 may transmit the uplink signal interfaced by the second interface circuit 2115 to the base station 100-1.

The synchronization controller 2117 may control synchronization of each of the components (2111 to 2116) in the RF processing part 2110 based on any one of a plurality of system clock signals generated by the clock generator 2154.

The main processing part 2120 distributes or branches uplink signals transmitted by combining different types of signals transmitted through the head-end device 210, or selects or combines different types of downlink signals and transmits them.

The main processing part 2120 may include a multiplexer 2121, a buffer 2122, a recovery circuit 2123, a demultiplexer 2124, and a synchronization controller 2125.

In downlink communication, the multiplexer 2121 may receive different types of downlink signals and select and output any one of the received downlink signals.

According to an embodiment, the multiplexer 2121 may combine different types of downlink signals to output the combined downlink signal.

According to an embodiment, the different types of downlink signals may include downlink signals received from the RF processing part 2110 and downlink signals received from the Ethernet processing part 2140.

The buffer 2122 may buffer and output a downlink signal output from the multiplexer 2121.

According to an embodiment, the buffer 2122 may be implemented as a fan-out buffer.

In uplink communication, the recovery circuit 2123 may recover clock signals and data contained in an uplink signal received from physical layer receiver 2132.

The demultiplexer 2124 may distribute or branch different types of uplink signals included in an uplink signal received through the reconstruction circuit 2123, and may transmit the distributed or branched uplink signals to the RF processing part 2110 and the Ethernet processing part 2140, respectively.

The synchronization controller 2125 may control synchronization of each of the components (2121 to 2124) in the main processing part 2120 based on any one of the plurality of system clock signals generated by the clock generator 2154.

The physical layer transmitter 2131 may receive a downlink signal processed and output by the main processing part 2120 and a system clock signal generated by the clock generator 2154. For example, the system clock signal may be a clock signal commonly used for synchronization of a physical layer transceiver.

The physical layer transmitter 2131 may transmit the received downlink signal to the outside of the head-end device 210 by synchronizing with the received system clock signal. The signal output from the physical layer transmitter 2131 may be transmitted to the remote device 230a or the extension device 220a connected to the head-end device 210.

The physical layer receiver 2132 may receive an uplink signal received by the head-end device 210 and a system clock signal generated by the clock generator 2154. For example, the system clock signal may be a clock signal commonly used for synchronization of a physical layer transceiver.

The physical layer receiver 2132 may transmit the received uplink signal to the main processing part 2120 in synchronization with the received system clock signal.

The Ethernet processing part 2140 processes Ethernet data or IP data transmitted and received with the IP network 100-2, or processed Ethernet data or processed IP data.

The Ethernet processing part 2140 may include an Ethernet physical layer 2141, an Ethernet switch 2142, and a synchronization controller 2143.

The Ethernet physical layer 2141 may interface the Ethernet data or the IP data transmitted and received with the IP network 100-2.

The Ethernet switch 2142 may switch a signal path in downlink communication or uplink communication of the Ethernet processing part 2140.

In downlink communication, the Ethernet switch 2142 may transmit Ethernet data or IP data received from the Ethernet physical layer 2141 to the main processing part 2120.

In uplink communication, the Ethernet switch 2142 may transmit Ethernet data or IP data received from the main processing part 2120 to the Ethernet physical layer 2141.

The synchronization controller 2143 may control synchronization of each of the components (2141 to 2142) in the Ethernet processing part 2140 based on any one of the plurality of system clock signals generated by the clock generator 2154.

The local clock 2151 may autonomously generate a clock in the head-end device 210. According to an embodiment, the local clock 2151 may be implemented by including a combination of an oscillation circuit and crystals or a local oscillator.

An external clock source 2152 may be located outside the head-end device 210 or outside the communication system 200 to be communicatively connected to the head-end device 210 and may provide an external clock.

According to an embodiment, the external clock source 2152 may be implemented as any one of a primary reference source (PRS), a primary reference clock (PRC), a synchronization supply unit (SSU), stand-alone synchronization equipment (SASE), a building integrated timing supply (BITS), an SDH equipment clock (SEC), a base station, and a GPS device.

The clock switch 2153 may select one of an internal clock signal generated by the local clock 2151 and an external clock signal input from the external clock source 2152, and may transmit the selected clock signal to the clock generator 2154.

According to an embodiment, the clock switch 2153 basically transmits the external clock signal input from the external clock source 2152 to the clock generator 2154, but may transmit the internal clock signal generated by the local clock 2151 to the clock generator 2154 when a synchronization loss occurs.

The clock generator may generate a plurality of system clock signals used to synchronize components included in each of communication nodes in the communication system 200 based on the internal clock signal or the external clock signal received from the clock switch 2153.

According to an embodiment, the plurality of system clock signals may include at least one of a first system clock signal commonly used for synchronization of an RF processing part (e.g., 2110), a second system clock signal commonly used for synchronization of an Ethernet processing part (e.g., 2140), a third system clock signal commonly used for synchronization of a main processing part (e.g., 2120), and a fourth system clock commonly used for synchronization of a physical layer transceivers (e.g., 2131 and 2132).

According to an embodiment, the first system clock signal, the second system clock signal, the third system clock signal, and the fourth system clock signal may be clock signals having different frequencies.

Figure 3:
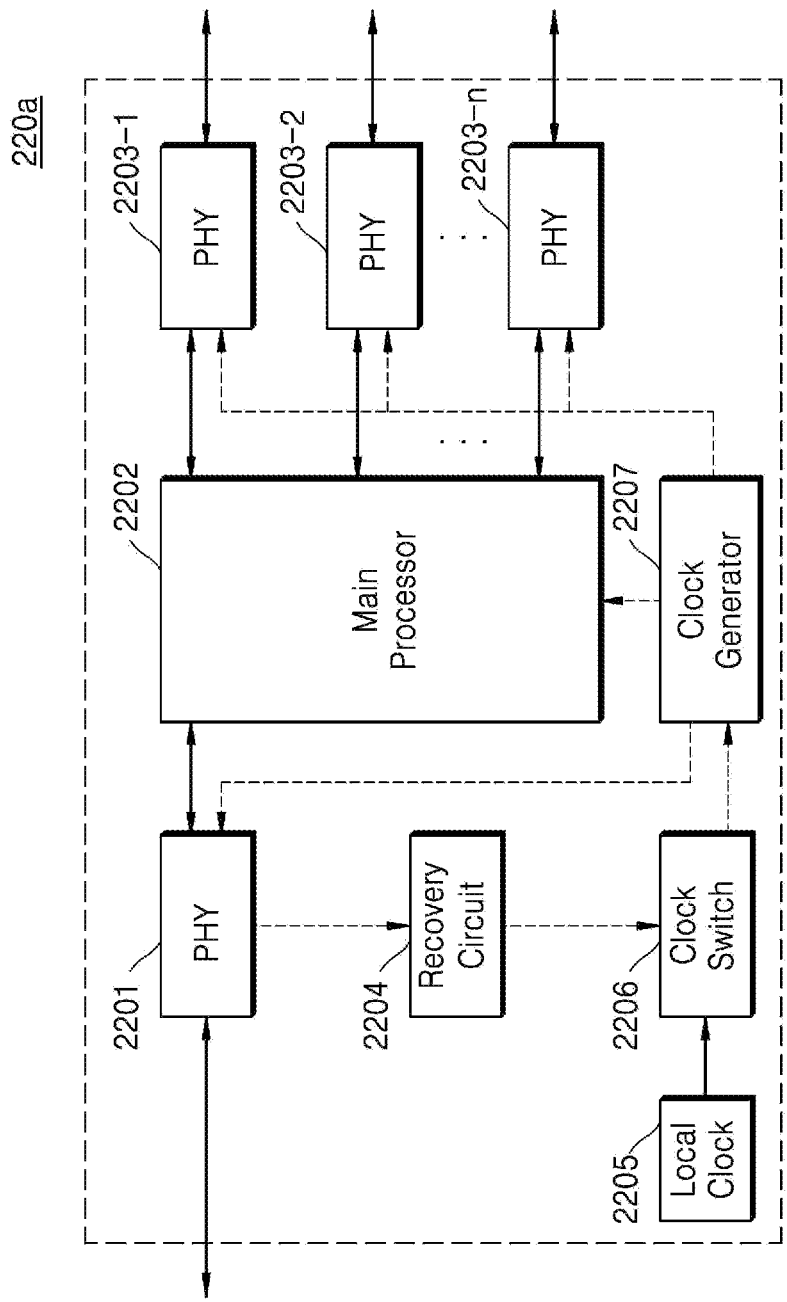
FIG. 3 is a block diagram according to an embodiment of an extension device in FIG. 1.

FIG. 3 is a block diagram according to an embodiment of the extension device 220a in FIG. 1.

Referring to FIGS. 1 to 3, the extension device 220a may include an upper physical layer transceiver 2201, a main processor 2202, a plurality of lower physical layer transceivers 2203-1 to 2203-n, and a recovery circuit 2204, a local clock 2205, a clock switch 2206, and a clock generator 2207.

The upper physical layer transceiver 2201 may transmit and receive an uplink signal or a downlink signal with the head-end device 210 through a physical layer.

According to an embodiment, the upper physical layer transceiver 2201 may synchronize an uplink signal or a downlink signal with a system clock signal generated by the clock generator 2207, and may transmit and receive the synchronized signal with the head-end device 210.

According to an embodiment, the system clock signal may be a clock signal commonly used for synchronization of a physical layer transceiver (e.g., 2131 and 2132 of FIG. 2).

In the case of the extension device 220a having the remote device 230a connected to an upper end, the upper physical layer transceiver 2201 may transmit and receive an uplink signal or a downlink signal with the remote device 230a through a physical layer.

The main processor 2202 may perform overall signal processing in the extension device 220a. The main processor 2202 may distribute a downlink signal received from the upper end to the plurality of lower physical layer transceivers 2203-1 to 2203-n, or may combine or switch uplink signals received through the plurality of lower physical layer transceivers 2203-1 to 2203-n to transmit to the upper physical layer transceiver 2201.

According to an embodiment, the main processor 2202 may control synchronization of the main processor 2202 based on any one of a plurality of system clock signals generated by the clock generator 2207.

For example, the system clock signal may be a clock signal commonly used for synchronization of a main processing part (e.g., 2120 of FIG. 2).

The plurality of lower physical layer transceivers 2203-1 to 2203-n may be connected to remote devices (e.g., 230c) connected to a lower end of the extension device 220a, respectively, and may transmit and receive an uplink signal or a downlink signal with the remote devices (e.g., 230c) connected to the lower end of the extension device 220a through a physical layer.

According to an embodiment, each of the plurality of lower physical layer transceivers 2203-1 to 2203-n synchronizes an uplink signal or a downlink signal with the system clock signal generated by the clock generator 2207, and may transmit and receive the synchronized signal with each of remote devices (e.g., 230c) connected to the lower end of the extension device 220a.

According to an embodiment, the system clock signal may be a clock signal commonly used for synchronization of a physical layer transceiver (e.g., 2131 and 2132 of FIG. 2).

The recovery circuit 2204 may recover clock signals and data included in a downlink signal or an uplink signal received from the upper physical layer transceiver 2201.

The local clock 2205 may autonomously generate a clock in the extension device 220a. According to an embodiment, the local clock 2205 may be implemented by including a combination of an oscillator and crystals or a local oscillator.

The clock switch 2206 may select one of an internal clock signal generated by the local clock 2205 and a clock signal recovered by the recovery circuit 2204, and may transmit the selected clock signal to the clock generator 2207.

According to an embodiment, the clock switch 2206 basically transmits the clock signal recovered by the recovery circuit 2204 to the clock generator 2207, but may transmit the internal clock signal generated by the local clock 2205 to the clock generator 2207 when a synchronization loss occurs.

The clock generator 2207 may generate a plurality of system clock signals used to synchronize components in the extension device 220a based on the internal clock signal or the recovered clock signal received from the clock switch 2206.

According to an embodiment, the plurality of system clock signals may include at least one of a third system clock signal commonly used for synchronization of a main processing part (e.g., 2120 of FIG. 2 or 2202 of FIG. 3), and a fourth system clock signal commonly used for synchronization of a physical layer transceiver (e.g., 2131 and 2132 of FIG. 2 or 2201 and 2203-1 to 2203-n of FIG. 3).

The extension device 220b illustrated in FIG. 1 may be implemented in substantially the same structure as the extension device 220a illustrated in FIG. 3, and only a configuration corresponding to an object that transmits and receives signals at both ends may be changed.

Figure 4:
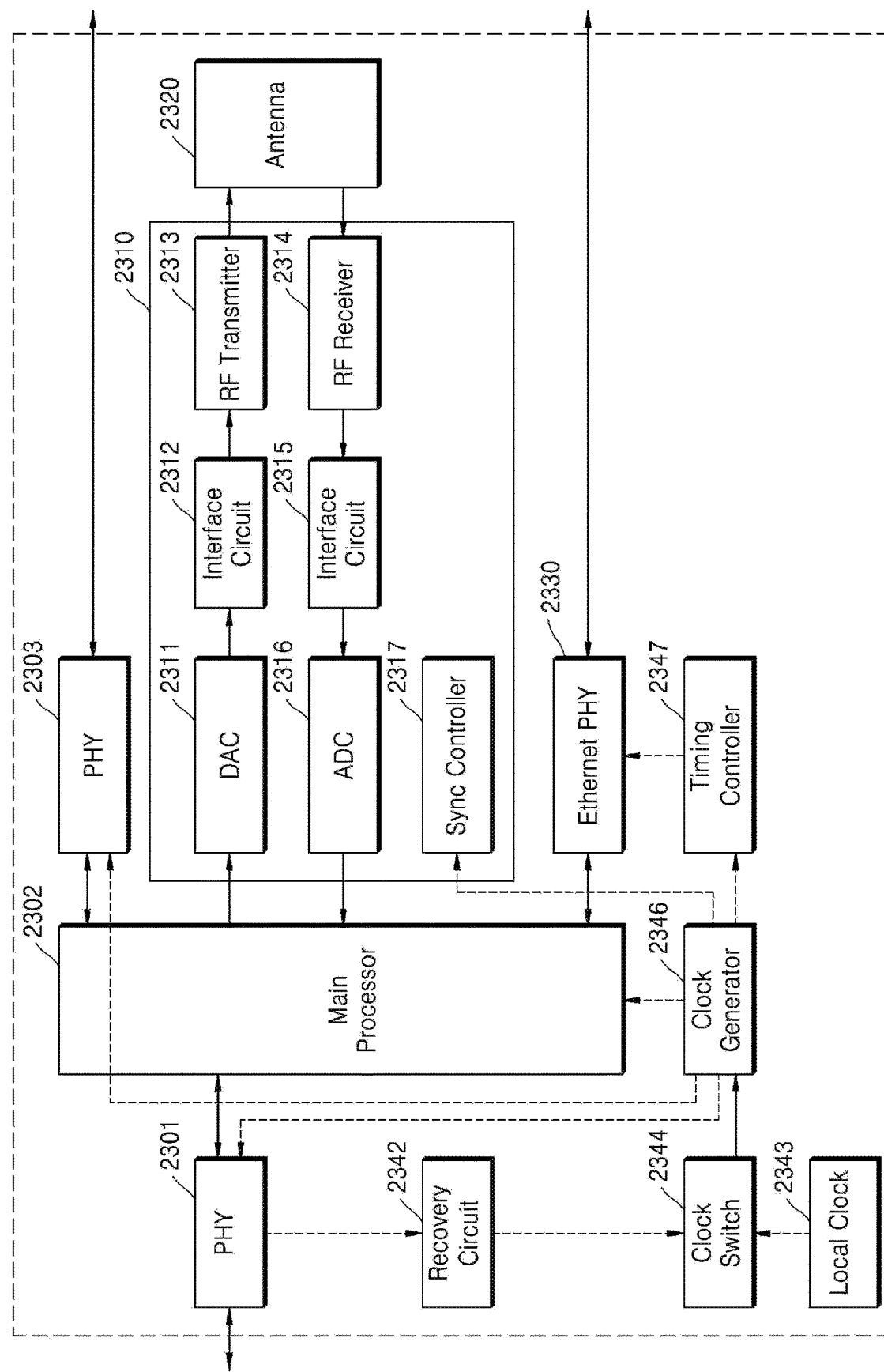
FIG. 4 is a block diagram according to an embodiment of a remote device in FIG. 1.

FIG. 4 is a block diagram according to an embodiment of the remote device in FIG. 1.

Referring to FIGS. 1 to 4, the remote device 230 may include an upper physical layer transceiver 2301, a main processor 2302, a lower physical layer transceiver 2303, an RF processing part 2310, an antenna 2320, an Ethernet physical layer 2330, a recovery circuit 2342, a local clock 2343, a clock switch 2344, a clock generator 2346, and a timing controller 2347.

The upper physical layer transceiver 2301 may transmit and receive an uplink signal or a downlink signal with the extension device 220a through a physical layer.

According to an embodiment, the upper physical layer transceiver 2301 may synchronize an uplink signal or a downlink signal with a system clock signal generated by the clock generator 2346, and may transmit and receive the synchronized signal with the extension device 220a.

According to an embodiment, the system clock signal may be a clock signal commonly used for synchronization of a physical layer transceiver (e.g., 2131 and 2132 of FIG. 2 or 2201 and 2203-1 to 2203-n of FIG. 3).

The main processor 2302 may perform overall signal processing in the remote device 230c.

The main processor 2302 may distribute a downlink signal received from an upper node of the remote device 230c to each of the lower physical layer transceiver 2303, the RF processing part 2310, and the Ethernet physical layer 2330, or may combine or switch received uplink signals to transmit to the upper physical layer transceiver 2301.

According to an embodiment, the main processor 2302 may control synchronization of the main processor 2302 based on any one of system clock signals generated by the clock generator 2348.

For example, the system clock signal may be a clock signal commonly used for synchronization of a main processing part (e.g., 2120 of FIG. 2 or 2202 of FIG. 3).

The lower physical layer transceiver 2303 may be included when a remote device (not shown) is daisy chained to a lower end of the remote device 230c, and may transmit and receive an uplink signal or a downlink signal with a remote device connected through a physical layer.

The RF processing part 2310 may process an RF signal (or digitized RF signal) distributed from the main processor 2302 in downlink communication and transmit the RF signal to terminals through the antenna 2320, or may process and transmit an RF signal received from the terminals in uplink communication to the main processor 2302.

According to an embodiment, the RF processing part 2310 may transmit and receive an RF signal with the terminals through the antenna 2320.

The RF processing part 2310 may include a digital-to-analog converter 2311, a first interface circuit 2312, an RF transmitter 2313, an RF receiver 2314, a second interface circuit 2315, an analog-to-digital converter 2316, and a synchronization controller 2317

In downlink communication, the digital-to-analog converter 2311 may convert a digital downlink signal received from the main processor 2302 into an analog downlink signal and output the analog downlink signal.

The first interface circuit 2312 may interface the analog downlink signal output from the digital-to-analog converter 2311. According to an embodiment, the first interface circuit 2312 may process the analog downlink signal to be transmitted through the antenna 2320 by adjusting the power of the analog downlink signal or by up-converting frequencies.

The RF transmitter 2313 may transmit a downlink signal in the form of an RF signal through the antenna 2320.

In uplink communication, the RF receiver 2314 may receive an uplink signal in the form of an RF signal through the antenna 2320.

The second interface circuit 2315 may interface an analog uplink signal output from the RF receiver 2314. According to an embodiment, the second interface circuit 2315 may interface the analog uplink signal to be processed in the communication system 210 by adjusting the power of the analog uplink signal or down-converting frequencies.

The analog-to-digital converter 2316 may convert an analog uplink signal output from the second interface circuit 2315 into a digital uplink signal and output the digital uplink signal.

The synchronization controller 2317 may control synchronization of each of the components (2311 to 2316) in the RF processing part 2310 based on any one of system clock signals generated by the clock generator 2346.

For example, the system clock signal may be a clock signal commonly used for synchronization of an RF processing part (e.g., 2110 of FIG. 2).

An Ethernet physical layer transceiver 2330 may process Ethernet data (or IP data) distributed from the main processor 2302 in downlink communication and transmit the processed Ethernet data (or IP data) to terminals through the small cell 300c, and may process the Ethernet data (or IP data) received from the terminals through the small cell 300c in uplink communication and transmit the processed Ethernet data (or IP data) to the main processor 2302.

The Ethernet physical layer transceiver 2330 may be synchronized under the control of the timing controller 2347 based on the any one of the system clock signals generated by the clock generator 2346.

According to an embodiment, the Ethernet physical layer transceiver 2330 may transmit the any one of the system clock signals generated by the clock generator 2346 to a connected small cell (e.g., 300c).

For example, the system clock signal may be a clock signal commonly used for synchronization of an Ethernet processing part (e.g., 2140 of FIG. 2).

According to an embodiment, the Ethernet physical layer transceiver 2330 may transmit the any one of the system clock signals to a small cell (e.g., 300c) according to a synchronous Ethernet (SyncE) standard.

The recovery circuit 2342 may recover clock signals and data included in the downlink signal or the uplink signal received from the upper physical layer transceiver 2301.

The local clock 2205 may autonomously generate a clock in the remote device 230c. According to an embodiment, the local clock 2343 may be implemented by including a combination of an oscillator and crystals or a local oscillator.

The clock switch 2344 may select one of an internal clock signal generated by the local clock 2343 and a clock signal recovered by the recovery circuit 2342, and may transmit the selected clock signal to the clock generator 2346.

According to an embodiment, the clock switch 2344 basically transmits the clock signal recovered by the recovery circuit 2342 to the clock generator 2346, but may transmit the internal clock signal generated by the local clock 2343 to the clock generator 2346 when a synchronization loss occurs.

The clock generator 2346 may generate a plurality of system clock signals used to synchronize components in the remote device 230c based on the internal clock signal or the recovered clock signal received from the clock switch 2344.

According to an embodiment, the plurality of system clock signals may include at least one of a first system clock signal commonly used for synchronization of an RF processing part (e.g., 2110 of FIG. 2 or 2310 of FIG. 4), a second system clock signal commonly used for synchronization of an Ethernet processing part (e.g., 2140 of FIG. 2 or 2330 of FIG. 4), a third system clock signal commonly used for synchronization of a main processing part (e.g., 2120 of FIG. 2, 2202 of FIG. 3, or 2302 of FIG. 4), and a fourth system clock signal commonly used for synchronization of a physical layer transceiver (e.g., 2131 and 2132 of FIGS. 2, 2201 and 2203-1 to 2203-n of FIG. 3, or 2301 and 2303 of FIG. 4).

The remote devices 230a to 230d illustrated in FIG. 1 may be implemented in substantially the same structure as the remote device 230c illustrated in FIG. 3, and only a configuration corresponding to an object that transmits and receives signals at both ends may be changed.

While the present disclosure has been particularly shown and described with reference to embodiments thereof, it will be understood that various changes in form and details may be made therein without departing from the spirit and scope of the following claims.

The invention claimed is:

1. A head-end device comprising:
a clock switch configured to select one of an internal clock generated by a local clock and an external clock input from an external clock source;
a clock generator configured to generate a plurality of system clock signals used to synchronize components included in each of communication nodes in a communication system based on the selected clock by the clock switch; and
a physical layer configured to transmit any one of the generated system clock signals to a communication node connected to the head-end device,
wherein the clock switch is configured to:
select the external clock as default; and
select the internal clock when a synchronization loss occurs.

2. The head-end device of claim 1, wherein the physical layer is configured to transmit a downlink signal to the communication node connected to the head-end device by synchronizing with one of the generated system clock signals.

3. The head-end device of claim 1, wherein the external clock source is any one of a primary reference source (PRS), a primary reference clock (PRC), a synchronization supply unit (SSU), stand-alone synchronization equipment (SASE), a building integrated timing supply (BITS), an SDH equipment clock (SEC), a base station, and a GPS device that are located outside the head-end device and communicatively connected to each other.

4. The head-end device of claim 1, wherein the local clock comprises a combination of an oscillation circuit and crystals or a local oscillator.

5. The head-end device of claim 1, wherein the plurality of system clock signals comprise:
at least one of a first system clock signal commonly used for synchronization of an RF processing part included in the communication nodes in the communication system, a second system clock signal commonly used for synchronization of an Ethernet processing part included in the communication nodes, a third system clock signal commonly used for synchronization of a main processing part included in the communication nodes, and a fourth system clock signal commonly used for synchronization of a physical layer transceiver included in the communication nodes.

6. The head-end device of claim 5, wherein the plurality of system clock signals are clock signals having different frequencies.

7. A communication node comprising:
an upper physical layer transceiver configured to receive a communication signal;
a recovery circuit configured to recover a clock signal and data included in the communication signal received from the upper physical layer transceiver;
a local clock configured to generate an internal clock signal;
a clock switch configured to select one of the recovered clock signal and the internal clock signal; and
a clock generator configured to generate a plurality of system clock signals used to synchronize components in the communication node based on the selected clock signal.

8. The communication node of claim 7, wherein the clock switch is configured to:
select the recovered clock signal as default; and
select the internal clock signal when a synchronization loss occurs.

9. The communication node of claim 7, further comprising:
a lower physical layer transceiver configured to transmit a communication signal to another communication node connected to the communication node by synchronizing with one of the generated system clock signals by the clock generator.

10. The communication node of claim 9, wherein the communication node is an extension device connected between a head-end device and a remote device, and
wherein the upper physical layer transceiver is connected to the head-end device, and the lower physical layer transceiver is connected to the remote device.

11. The communication node of claim 9, wherein the communication node is a remote device, and
wherein the upper physical layer transceiver is connected to a head-end device or an extension device, and the lower physical layer transceiver is connected to another remote device or a small cell.

12. The head-end device of claim 11, wherein the lower physical layer transceiver comprises an Ethernet physical layer transceiver, and
    any one of the system clock signals is transmitted to the small cell according to a synchronous Ethernet (SyncE) standard.

\* \* \* \* \*